No. 835,748. PATENTED NOV. 13, 1906.
J. H. O. BUNGE.
ELASTIC FLUID TURBINE.
APPLICATION FILED FEB. 14, 1906.
3 SHEETS—SHEET 1.
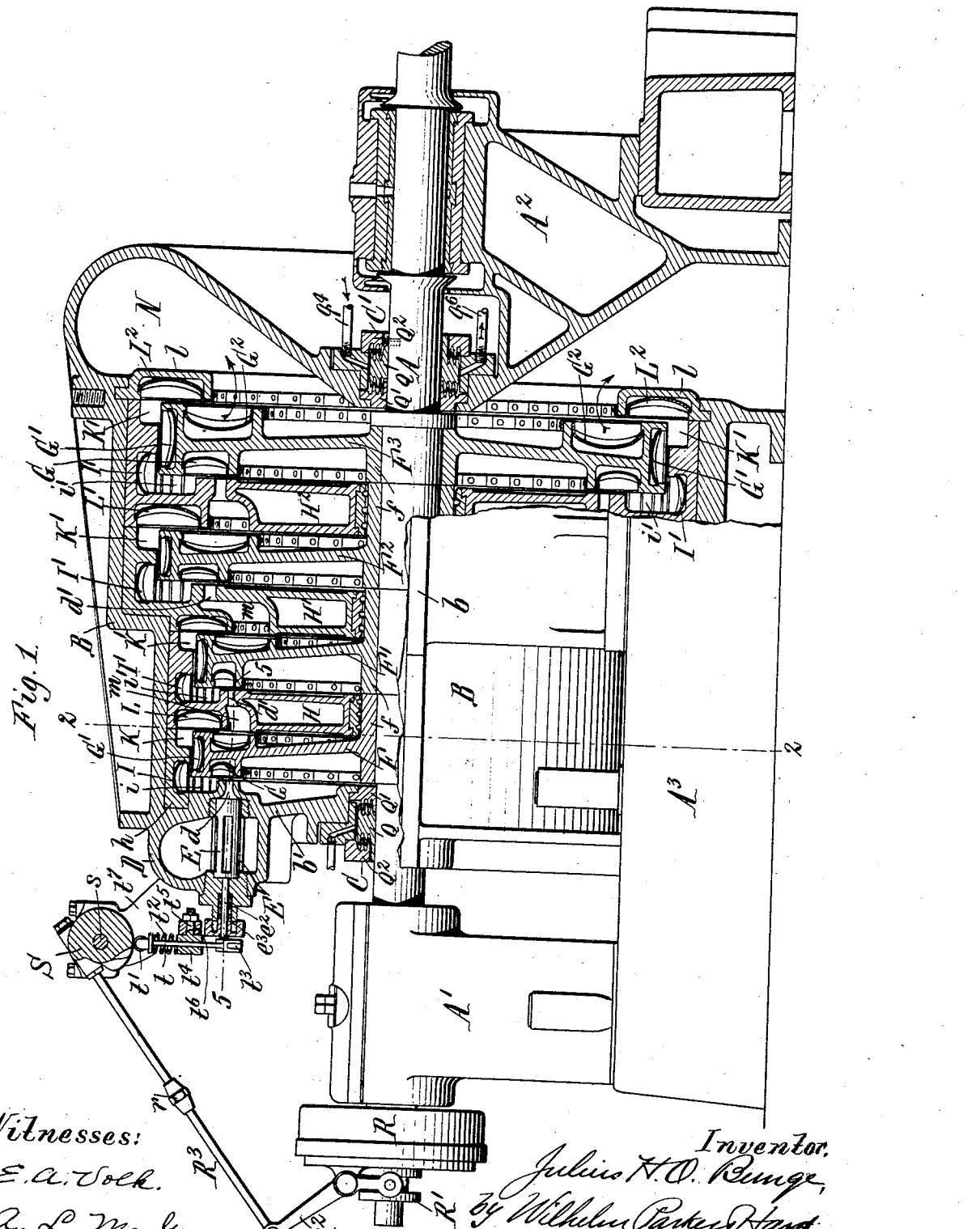
Witnesses:
E. A. Volk.
A. L. McGee.
Inventor.
Julius H. O. Bunge,
by Wilhelm, Parker & Hard
Attorneys No. 835,748. PATENTED NOV. 13, 1906.
J. H. O. BUNGE.
ELASTIC FLUID TURBINE.
APPLICATION FILED FEB. 14, 1906.
3 SHEETS—SHEET 2.
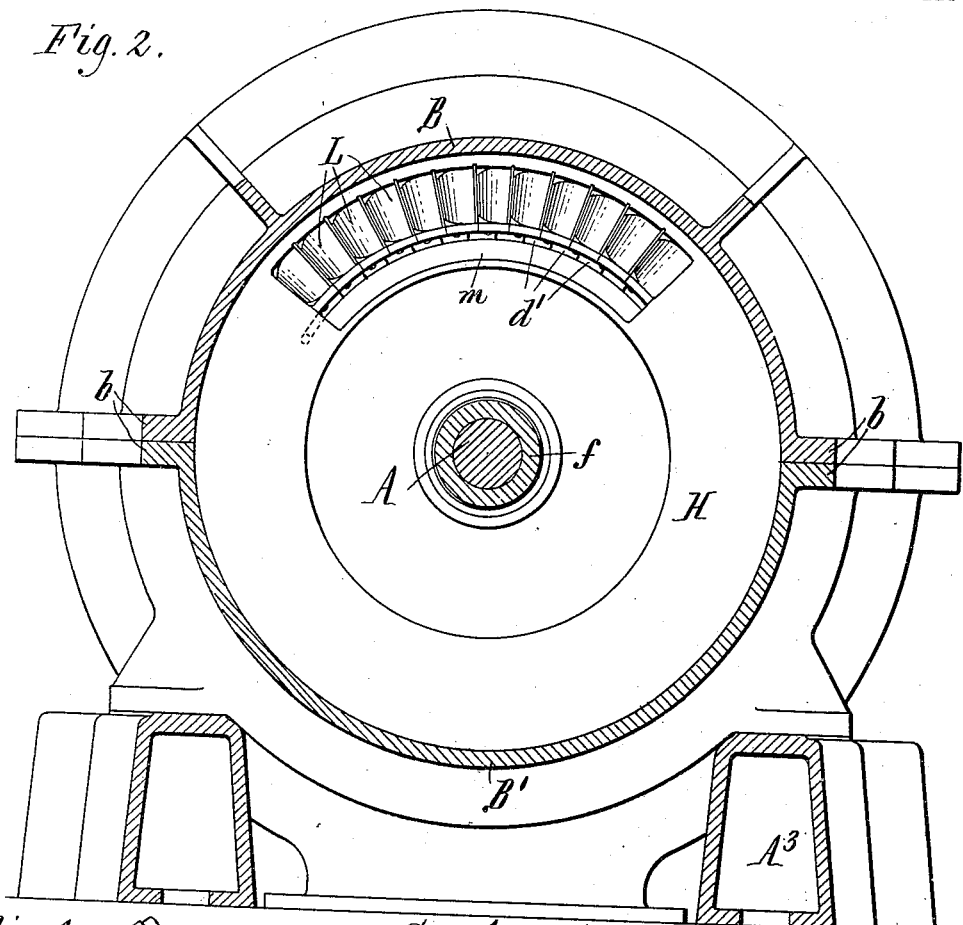
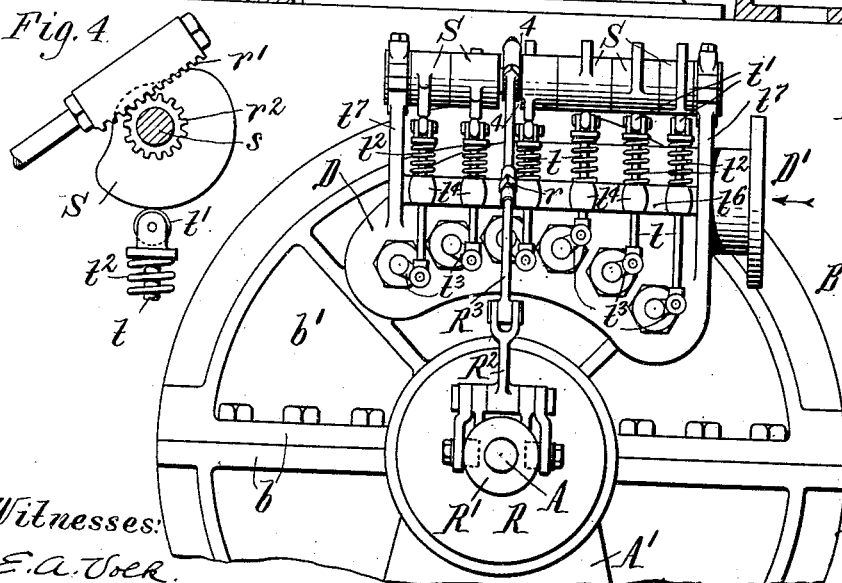
Witnesses:
E. A. Voek.
A. L. McGee.
Inventor.
Julius H. O. Bunge,
by Wilhelm, Parker & Hard, Attorneys.

No. 835,748. PATENTED NOV. 13, 1906.
J. H. O. BUNGE.
ELASTIC FLUID TURBINE.
APPLICATION FILED FEB. 14, 1906.
3 SHEETS—SHEET 3.
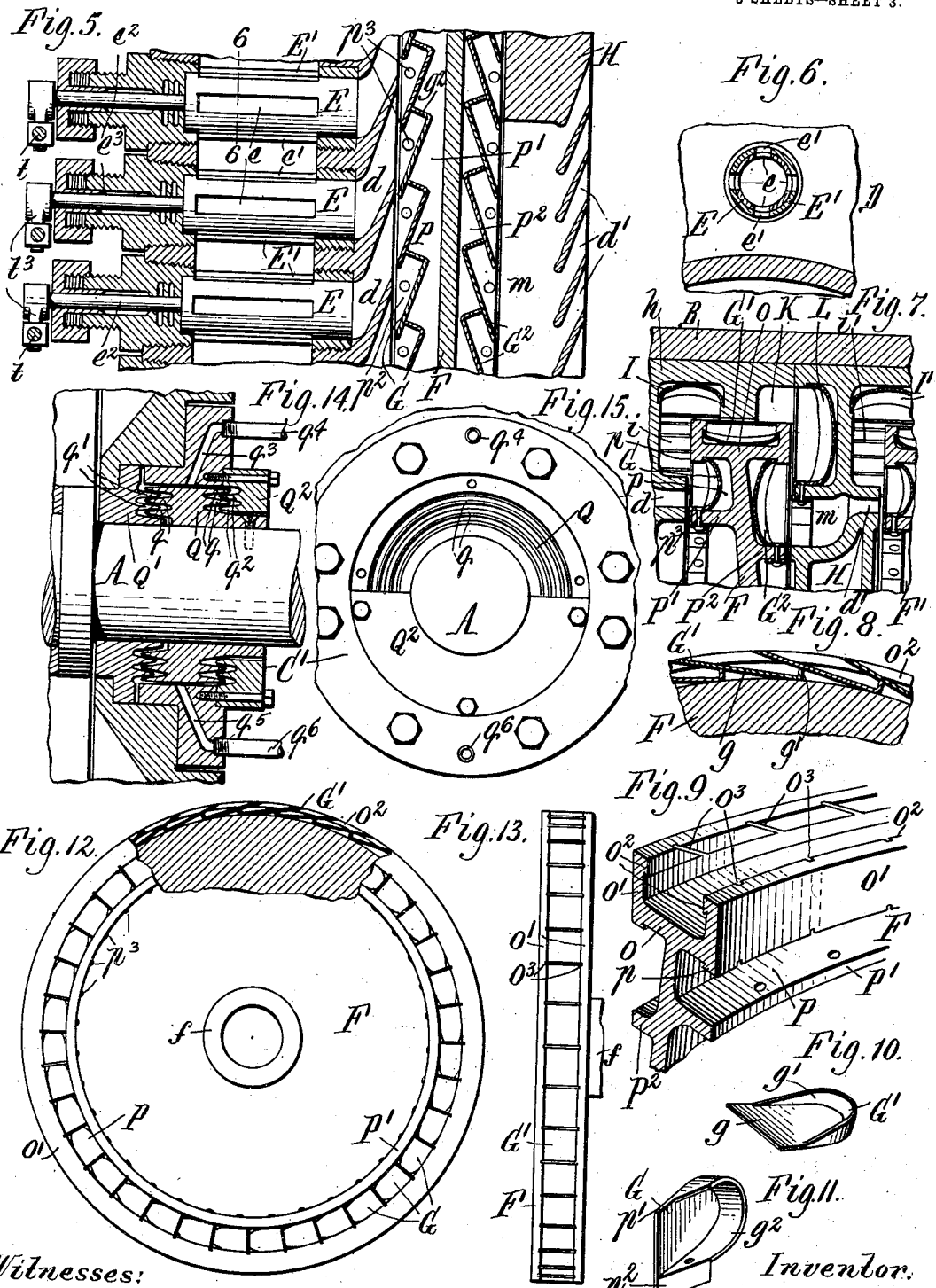
Witnesses:
E. A. Volk.
A. L. McGee.
Inventor.
Julius H. O. Bunge,
By Wilhelm, Parker & Hard,
Attorneys.

UNITED STATES PATENT OFFICE.

JULIUS H. O. BUNGE, OF BUFFALO, NEW YORK.

ELASTIC-FLUID TURBINE.

No. 835,748.   Specification of Letters Patent.   Patented Nov. 13, 1906.

Application filed February 14, 1906. Serial No. 300,972.

*To all whom it may concern:*

Be it known that I, JULIUS H. O. BUNGE, a subject of the Queen of the Netherlands, residing at Buffalo, in the county of Erie and State of New York, have invented a new and useful Improvement in Elastic-Fluid Turbines, of which the following is a specification.

This invention relates mainly to that class of steam-turbines in which the energy of the steam is developed in several successive stages or steps, although certain parts of the invention are also applicable to other styles of turbines.

The objects of this invention are to so construct the turbine that wheels of comparatively small diameter can be used while employing a comparatively small nozzle velocity, thereby producing a turbine which is compact in construction and in which the losses of energy resulting from the friction of the steam and other causes are reduced to a minimum; also, to provide a simple, convenient, and effective construction of the buckets.

In the accompanying drawings, consisting of three sheets, Figure 1 is a longitudinal sectional elevation of a turbine provided with my improvements. Fig. 2 is a vertical cross-section in line 2 2, Fig. 1. Fig. 3 is a fragmentary front elevation. Fig. 4 is a vertical section through the valve-shaft in line 4 4, Fig. 3, on an enlarged scale. Fig. 5 is a horizontal fragmentary section, on an enlarged scale, through the valve-chest, the first bucket-wheel, and the partition in rear of said wheel, the section being taken approximately in line 5 5, Fig. 1. Fig. 6 is a cross-section through one of the valves and its seat in line 6 6, Fig. 5. Fig. 7 is a fragmentary longitudinal section of the outer portions of the first and second wheels and connecting parts. Fig. 8 is a fragmentary section parallel with the plane of the wheel through the axial buckets. Fig. 9 is a perspective view of a portion of the rim of one of the wheels. Fig. 10 is a perspective view of one of the axial buckets. Fig. 11 is a perspective view of one of the radial buckets. Fig. 12 is a side elevation of one of the wheels, partly in section. Fig. 13 is a face view of the same. Fig. 14 is a longitudinal sectional elevation of one of the stuffing-boxes for the turbine-shaft. Fig. 15 is a front elevation thereof with part of the gland removed.

Like letters of reference refer to like parts in the several figures.

A represents the turbine-shaft, supported in front and rear bearings $A'$ $A^2$ on a bed-plate $A^3$.

The turbine-casing consists, preferably, of upper and lower halves B B', joined by horizontal flanges $b$ and provided with front and rear stuffing-boxes C C', through which the shaft extends.

D represents the steam-chest formed on the front wall $b'$ of the upper part B of the casing and provided at one side with a steam-inlet D' and in its rear wall with a series of steam-nozzles $d$, by which the steam is supplied to the first stage buckets. These primary steam-nozzles are each controlled by a hollow cylindrical valve E, which is arranged in the chest in front of the nozzle in a cylindrical seat E'. The valve-seat is preferably secured in the front and rear walls of the chest, and the valve and seat are both provided with longitudinal slots $e$ $e'$, respectively, Figs. 1, 5, and 6, so that the rocking motion of the valve controls the admission of the steam to the nozzle. Each valve is provided with a stem $e^2$, which extends through a stuffing-box $e^3$ in the front wall of the steam-chest.

The turbine represented in the drawings is provided with four wheels or disks F F' $F^2$ $F^3$, upon which the steam acts successively in passing from the initial nozzles $d$ to the exhaust or vacuum space; but the number of these wheels or disks may be varied as may be desirable. Each of these wheels is provided with three sets of buckets, a set of radial buckets G on the front side of the wheel, a set of axial buckets G' on the peripheral face of the wheel, and a set of radial buckets $G^2$ on the rear side of the wheel, and the steam-passages are so arranged that the steam acts successively upon the front buckets G, the axial buckets G', and the rear buckets $G^2$ of each wheel.

The several wheels are separated by partitions H H' $H^2$, which extend from the hubs $f$ of the wheels to the casing and which are preferably made in halves like the casing, so that they can be removed with the halves of the casing for exposing the wheels.

The initial nozzles $d$ are arranged to deliver the steam to the inner portions of the radial front buckets G of the first or primary wheel F, and the casing is provided on the rear side of its front wall outside of said nozzles with a passage $i$, which receives the steam as it escapes from the outer portions of these buckets and conducts the steam to axial guide-buckets I, Figs. 1 and 7, which are arranged on the inner side of the casing with their front portions opposite the passage $i$ and with their rear portions opposite the front portions of the axial buckets G' of the first wheel F. The steam passes into these guide-buckets I in an outward direction at the front and is reversed in direction by passing through these buckets and delivered in an inward direction from the rear portions of these buckets to the front portions of the axial buckets G' of the first wheel. The casing is provided in rear of said guide-buckets I with a passage K, which is arranged opposite the rear portions of the axial buckets G' of the first wheel and receives the steam therefrom and delivers the steam rearwardly beyond the wheel.

The guide-buckets I and the passage K are preferably contained in a ring $h$, which is arranged in the front portion of the casing outside of the first wheel F.

The steam escaping rearwardly from the passage K enters the outer portions of radial guide-buckets L, which extend inwardly on the rear side of the first wheel F and deliver the steam to the outer portions of the rear buckets $G^2$ of the first wheel. The steam escapes from the inner portions of the rear buckets $G^2$ into a steam-space $m$, which is provided on its rear side with secondary nozzles $d'$, by which the steam is delivered against the radial front buckets G of the second wheel F'. The steam passes from the outer portions of these buckets through a passage $i'$ to the axial guide-buckets G', and thence through a passage K' and guide-buckets L' to the rear buckets $G^2$, from which the steam passes to the next steam-space $m$, which delivers the steam by its nozzles $d'$ to the next following wheel.

The guide-buckets L, steam-space $m$, secondary nozzles $d'$, passage $i'$, guide-buckets I', and passage K' are preferably contained in the first partition H, as shown, and these parts are contained in the same relation with reference to the respective wheels in each following partition H' $H^2$.

The number of nozzles and the size of the buckets and passages and the diameters of the wheels are preferably increased in the direction in which the steam passes through the turbine in order to keep the steam velocity in these parts approximately constant as its volume increases with the decreasing pressure in the successive stages.

The steam passes from the passage K' of the last partition $H^2$ to the outer portions of a set of radial guide-buckets $L^2$, contained in a ring $l$, thence to the outer portions of the rear buckets $G^2$ of the last wheel $F^3$, and escapes from the inner portions of these buckets into an annular chamber N, which connects with the condenser or exhaust.

It will be seen from the foregoing that the passage of the steam is converted into velocity in successive steps or stages and that during each pressure step or stage the steam acts successively upon the front radial buckets, the axial buckets, and the rear radial buckets of a wheel. This means of utilizing the energy of the steam produces comparatively low nozzle velocities of the steam and a comparatively low peripheral speed of the wheels, permits the employment of comparatively small wheels, reduces losses by the friction of the steam against the buckets and guide-passages, and avoids end thrust.

The buckets are preferably made separate from the wheels, as shown, and stamped out of sheet steel or other suitable material and secured to the wheels by suitable means, Figs. 1, 7-12.

For the reception of the axial buckets G' the peripheral face of the wheel is provided with an annular channel formed by an annular rim O and outwardly-projecting flanges O'. Each of these flanges has an inwardly-overhanging ledge or lip $O^2$, and the two flanges are arranged so far apart that the flat bottom plate $g$ of the bucket will fit between them. The lips $O^2$ are provided on their inner opposing faces with inclined grooves $O^3$, arranged in pairs, into which the edges of the plate $g$ of the bucket are inserted, the bottom of the bucket resting, preferably, on the bottom of the channel. The bucket is straight across the top and half round or curved at the bottom and has a raised marginal flange $g'$ along its rounded bottom. This flange rests against the under sides of the ledges $O^2$ of the wheel and also against the bottom plate of the next following bucket, so that the bottom of one bucket forms the top or cover for the next adjacent bucket. The bucket being somewhat wider than the space between the ledges $O^2$ of the wheel, the bucket must be sprung in order to introduce the flange $g'$ of the bucket underneath the ledges $O^2$ of the wheel and the flat portion of the bucket into the grooves $O^3$. When the bucket has been so inserted, it is securely held in place by the flange of the bucket engaging underneath the ledges of the wheel.

For the reception of the front radial buckets G the wheel is provided on its flat front side with an annular channel P, formed between the peripheral rim O and an axial annular flange P' below the same. The rim O is provided on its under side with an annular ledge $p$, having oblique grooves for the reception of the outer edge $p'$ of the buckets. The bucket is provided at its inner edge with an angular extension or wing $p^2$, which fits against the edge and inner side of the annular flange P' of the wheel. The bucket rests with the lower part of its flange $g^2$ against the upper side of the flange P' and is secured to the latter by a rivet $p^3$.

The rear radial buckets $G^2$ are secured by similar means in a channel formed between the peripheral rim O and an annular flange $P^2$ below the same. These buckets are readily stamped of smooth sheet metal at comparatively small expense and are secured to the wheels in a very simple, durable, and inexpensive manner. The buckets of each set are uniform in weight, shape, and size and answer the purpose well, especially when the peripheral velocity of the wheel is comparatively low.

As shown in Fig. 7, the axial guide-buckets I may be secured by devices similar to those which have been described with reference to the axial buckets G' of the wheel and the radial guide-buckets L by devices similar to those which have been described with reference to the front and rear radial buckets G $G^2$.

The stuffing-boxes C C', which surround the shaft at the front and rear walls of the casing, are constructed with sinuous passages, to which steam is supplied for the purpose of preventing steam from leaking along the shaft. Each of these boxes is constructed as follows: Q, Figs. 1, 14, and 15, represents a collar, which is secured to the shaft within the stuffing-box C', between the bottom ring Q' and the cover or gland $Q^2$ thereof. This collar is provided at both sides with concentric annular projections $q$, which extend into spaces between similar annular projections $q'$ $q^2$, formed, respectively, on the bottom ring Q' and the cover $Q^2$ of the box. These annular projections taper, preferably, from the base to the edge and fit between each other or intermesh with a slight clearance which is somewhat greater lengthwise of the shaft than radially. The box is provided above the shaft with a steam-passage $q^3$, to which steam is supplied by a pipe $q^4$, and below the shaft with a drain-passage $q^5$, with which a drain-pipe $q^6$ is connected. Steam is supplied to the sinuous passages through the pipe $q^4$ and port $q^3$.

The steam fills the sinuous passages between the annular projections, but is driven away from the shaft by the centrifugal force created by the rotation of the collar Q and its annular projections. This centrifugal action and the friction which the steam encounters in the narrow sinuous passages between the rotating ring and the stationary parts of the box result in a practical equilibrium of pressure around the shaft, so that no leakage of steam can take place from the inside of the casing to the outer air at the front or high pressure end of the casing or of air to the inside of the casing at the vacuum side or rear end of the casing. The condensed sealing steam is conducted away by the drain-passage $q^5$ and pipe $q^6$.

The steam-valves E, which control the supply of steam to the initial nozzles $d$, are automatically operated by a governor of any suitable construction arranged on the main shaft A in a casing R. The mechanism by which the valves are operated from the governor is constructed as follows, Figs. 1-6: R' represents the collar, which is mounted on the shaft A and shifted by the governor axially thereon. $R^2$ is a lever which is pivoted to the governor-casing R or some other suitable support and is connected with its lower bifurcated arm to the collar R', while its upper arm is connected to a rod $R^3$, which extends upwardly to the valve mechanism. This rod is preferably composed of two parts, which are connected by an adjusting-nut $r$. The rod $R^3$ is provided at its upper end with a gear-rack $r'$, which meshes with a pinion $r^2$ on the horizontal valve-shaft $s$. The latter is provided with a series of cams S, one for each valve, so secured to the shaft that the valves are opened and closed successively. These cams bear upon upright actuating-rods $t$, which are preferably provided with antifriction-rollers $t'$ and held against the cam by springs $t^2$. The rods connect at their lower ends with arms $t^3$ on the outer ends of the valve-stems $e^2$. The upright rods $t$ are guided in slide-bearings $t^4$, which are attached by pivot-bolts $t^5$ to a horizontal supporting-bar $t^6$, extending across the front of the steam-chest between the brackets $t^7$, in which the horizontal shaft $s$ is journaled. The springs $t^2$ are supported on the bearings $t^4$. As the valve-shaft $s$ is turned in one direction by the action of the governor the cams depress the actuating-rods $t$ and turn the valves in their seats, so as to open the steam-ports of the valve-seats to a greater or less extent and admit steam to the nozzles. As the action of the governor turns the shaft in the opposite direction the springs on the actuating-rods return the valves toward their closed position and finally close the same successively.

The valves being balanced and the mechanism being very simple in construction and direct in its action, the resistance which the governor is required to overcome in operating the valves is but slight, and the mechanism is therefore very sensitive in its action.

I claim as my invention—

1. The combination of a turbine-wheel having radial front and rear buckets and intermediate axial buckets, a nozzle which supplies the steam to the radial front buckets, and means for conducting the steam from the radial front buckets to the axial buckets and from the latter to the radial rear buckets, substantially as set forth.

2. The combination of a turbine-wheel having radial front and rear buckets and intermediate axial buckets, means for supplying steam to the radial front buckets, and a casing provided with guide-buckets through which the steam passes between the radial front buckets and the axial buckets, and between the latter and the radial rear buckets, substantially as set forth.

3. The combination of a turbine-wheel having radial front and rear buckets and intermediate axial buckets, means for supplying steam to the radial front buckets, and a casing provided with axial guide-buckets which receive the steam from the radial front buckets of the wheel and deliver the steam to the axial buckets thereof, and radial guide-buckets which receive the steam from the axial buckets of the wheel and deliver the steam to the radial rear buckets thereof, substantially as set forth.

4. The combination of a turbine-wheel having radial front and rear buckets and intermediate axial buckets, a nozzle arranged to supply steam to the inner portions of the radial front buckets, a casing having a steam-passage which receives the steam from the outer portions of the radial front buckets, axial guide-buckets which receive the steam from said passage and deliver the steam to the front portions of the axial wheel-buckets, a passage in said casing which receives the steam from the rear portions of said axial wheel-buckets, and radial guide-buckets arranged to receive the steam from said last-mentioned passage in their outer portions and deliver the steam to the outer portions of the rear radial wheel-buckets, substantially as set forth.

5. I a multistage-turbine, the combination of successive turbine-wheels, each having radial front and rear buckets and intermediate axial buckets, a nozzle which delivers the steam to the radial front buckets of the primary wheel, means for conducting the steam from the radial front buckets of each wheel to the axial buckets and from the latter to the radial rear buckets, and means for conducting the steam from the radial rear buckets of the primary wheel to the radial front buckets of the succeeding wheel, substantially as set forth.

6. In a multistage-turbine, the combination of successive turbine-wheels, each having radial front and rear buckets and intermediate axial buckets, a nozzle which delivers the steam to the radial front buckets of the primary wheel, and an inclosing casing having a partition between said wheels and provided with axial guide-buckets between the radial front and the axial wheel-buckets, and radial guide-buckets between the axial and the rear radial wheel-buckets, substantially as set forth.

7. In a multistage-turbine, the combination of successive turbine-wheels, each having radial front and rear buckets and intermediate axial buckets, a casing, and a partition arranged between said wheels, said casing being provided with a steam-chest and nozzles for supplying steam to the front buckets of the primary wheel and with axial guide-buckets through which the steam passes between said front buckets and the axial wheel-buckets, and said partition being provided with radial guide-buckets through which the steam passes between the axial and the rear wheel-buckets and with a secondary nozzle which receives the steam from the rear wheel-buckets and delivers the steam to the radial front buckets of the following wheel, substantially as set forth.

8. In a turbine, the combination of a bucket-channel having an inwardly-overhanging part and a sheet-metal bucket which is arranged in said channel and sprung underneath said overhanging part, substantially as set forth.

9. In a turbine, the combination of a bucket-channel having on opposite sides inwardly-overhanging lips which are provided with grooves for the buckets, and buckets adapted to be inserted with their side portions into said grooves and to be sprung into said channel beneath said lips, substantially as set forth.

10. In a turbine, the combination of a bucket-channel and oblique buckets removably arranged therein, each bucket having a flat outer portion and a flanged inner portion, and the flat outer portion of one bucket extending over the flanged inner portion of the adjacent bucket, substantially as set forth.

11. In a turbine, the combination of a bucket-channel having opposite, inwardly-overhanging lips which are provided with grooves for the buckets, and buckets having flat outer portions which are arranged in said grooves and flanged inner portions which are arranged beneath said lips, substantially as set forth.

12. In a turbine, the combination of a bucket-channel having on one side an inwardly-overhanging lip provided with grooves for the buckets, and buckets having flat outer portions and flanged inner portions, the buckets having on one side an extension which is secured to the adjacent side of the channel and being arranged at the opposite side in the grooves of the lip, substantially as set forth.

13. In a turbine, the combination of an axial bucket-channel having inwardly-overhanging grooved lips on opposite sides, a radial bucket-channel having an inwardly-overhanging grooved lip on one side, axial buckets arranged in said axial channel and provided with flat outer portions which are arranged in said grooves and flanged inner portions which are arranged beneath said lips, and radial buckets arranged in said radial channel and having on one side extensions which are secured to the adjacent side of the
5 channel and arranged at the opposite side in the grooves of the lip, substantially as set forth.

Witness my hand this 5th day of February, 1906.

JULIUS H. O. BUNGE.

Witnesses:
 EDWARD WILHELM,
 C. B. HORNBECK.